Figure 1:
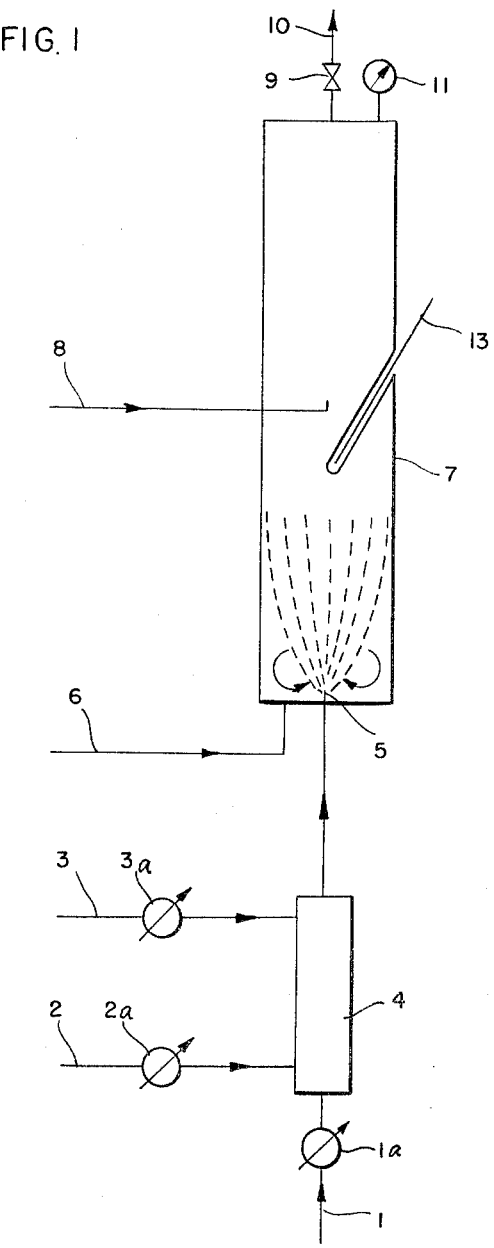

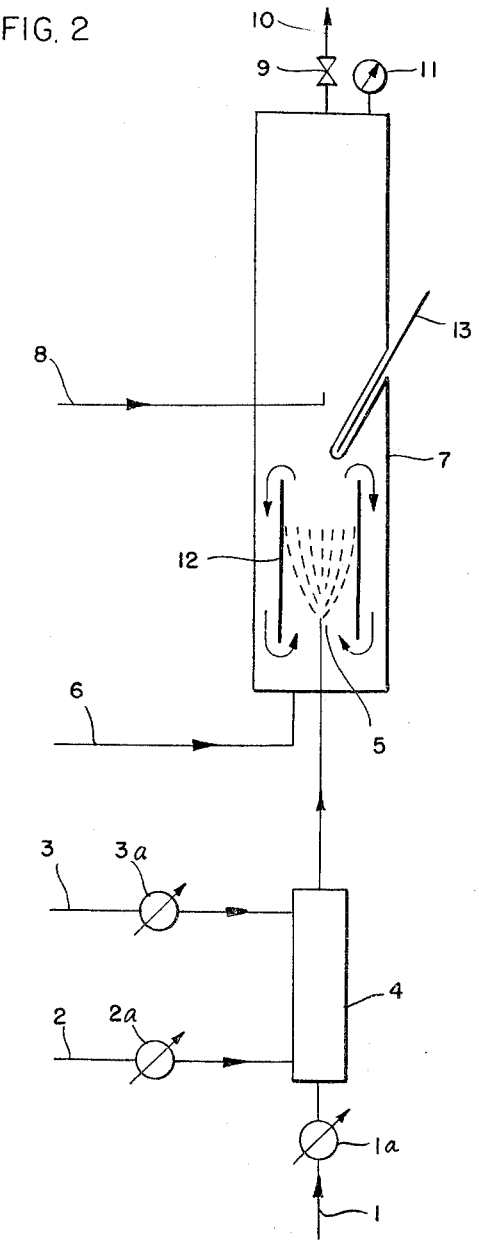

United States Patent Office 3,271,445
Patented Sept. 6, 1966

1

3,271,445
NITRIC ACID OXIDATION OF BENZENE COMPOUNDS CONTAINING OXIDIZABLE SIDE CHAINS
Ernst Bartholome, Heidelberg, Hans Nienburg, Ludwigshafen am Rhine, Walter Schenk, Heidelberg, Karl Scherf, Ludwigshafen am Rhine, Norbert Loesch, Hanhofen, Albrecht Wallis, Ludwigshafen am Rhine, and Ludwig Vogel, Frankenthal, Pfalz, Germany, assignors to Badische Anilin- & Soda-Fabrik Aktiengesellschaft, Ludwigshafen am Rhine, Germany
Filed Apr. 17, 1963, Ser. No. 273,723
Claims priority, application Germany, Apr. 26, 1962, B 66,985
4 Claims. (Cl. 260—524)

This invention relates to the oxidation of compounds of aromatic nature having oxidizable side chains to form the corresponding carboxylic acids. More particularly, the invention relates to an improved method of carrying out this reaction.

It is known from British patent specification 918,969 that benzene compounds substituted by 1 to 6 oxidizable side chains, such as alkyl, hydroxyalkyl, monochloroalkyl or dichloroalkyl can be oxidized by reacting them with nitric oxide of from 10 to 40 weight percent concentration at a temperature of from 150° to 400° C. by a process which comprises premixing the reactants and introducing them with turbulent flow and at a temperature below the reaction temperature into the lower end of a reaction zone, decreasing the speed of flow to at least one third and withdrawing the reaction products at the upper end of the reaction zone.

The object of the present invention is an improved process for the oxidation of organic compounds by which higher yields than by said prior art process can be obtained. It is another object of the present invention to provide improvements of the said prior art process by which the nitric acid is used up to a higher extent than in the said prior art process. Still a further object of the present invention is to provide improvements of the said prior art process by which the oxidation products are obtained in a higher degree of purity than those obtainable by the prior art process.

These and other objects and advantages will be better understood by the following detailed description when read in conjunction with FIGURES 1 and 2 of the accompanying drawings in which apparatus suitable for carrying out the process according to the invention are shown diagrammatically.

We have found that the nitric acid oxidation of a mononuclear aromatic compound which contains oxidizable side chains to the corresponding carboxylic acids can be carried out at an elevated temperature and an increased pressure, possibly in the presence of catalysts and/or oxygen-containing gases, in a vertical reactor through which the reactants flow upwardly, with the hereinbefore mentioned advantages by premixing the aromatic compound, 30 to 60% by weight of the nitric acid to be used and possibly diluent water for the nitric acid in a mixing apparatus at a temperature below the reaction temperature, leading this mixture with turbulent flow into the bottom of the reactor, reducing the velocity of flow of the mixture to at least one third upon entry into the reactor, introducing the 40 to 70% by weight of the nitric acid to be used into the middle third of the reaction zone, carrying out the oxidation adiabatically, and withdrawing the reaction products at the upper end of the reactor while avoiding a gas space at the upper end of the reactor. By decreasing the velocity of flow upon entry into the reactor the entering jet sucks hot reaction product to the point of entry of the premixed initial material. In this way, the oxidation reaction is initiated immediately at the point of entry, the location of the reaction zone thereby being fixed. It is also advantageous to introduce the part of nitric acid which is introduced into the middle third of the reaction zone in a manner as described for the part which is introduced from the bottom.

The other conditions of the process are those which are customary in nitric acid oxidation.

The process is carried out at a temperature between 150° and 400° C., advantageously between 180° and 300° C., and at increased pressure, for example between 10 and 150 atmospheres, especially between 50 and 120 atmospheres.

Oxidation can be carried out in the presence of catalysts, for example oxides and salts of metals of Groups IVA, IIB, VB, VIB, VIIB or VIII of the Periodic Chart of the elements. Examples of suitable catalysts are mercury nitrate, vanadium pentoxide, molybdenum trioxide, tungsten trioxide, chromium nitrate, iron nitrate, nickel nitrate and ammonium vanadate. The catalyst may be supplied with the diluent water or with the nitric acid or with both. The presence of a catalyst is however not essential.

It may be suitable to coemploy oxygen-containing gases, especially when it is desired to avoid reduction of nitric acid to non-regeneratable nitrous oxide and nitrogen. The introduction of the oxygen-containing gas advantageously takes place prior to the mixing zone. It is then uniformly distributed in the initial products and utilized to the optimum extent in the reaction zone.

Nitric acid with a concentration of about 10 to 40% by weight is used. It is possible either to use dilute nitric acid of this concentration or to employ concentrated nitric acid of more than 40% by weight concentration and dilute it with water to the desired concentration when the reactants are mixed.

The relative proportions of nitric acid and compounds to be oxidized depends on the number of oxidizable side chains and the concentration of the nitric acid. Since the oxidation of a methyl group proceeds according to the equation $-CH_3 + 2HNO_3 = -COOH + 2H_2O + 2NO$ at least the amount of nitric acid required according to this equation should be used. In general, however, an excess of nitric acid of up to about 20% should be used because consumption is increased by a number of side reactions. 30 to 60% by weight of the nitric acid is introduced from the bottom and 40 to 70% is introduced into the middle third of the reaction zone.

The process according to this invention may be used for the oxidation of benzene derivatives, containing at least 1 and preferably 2 or more (up to 6) oxidizable side chains with 1 to 4 carbon atoms. By the term "oxidizable side chains" we mean all groups which may be oxidized to carboxyl groups, i.e., alkyl groups, partly oxidized alkyl groups, or alkyl groups partly substituted by halogen atoms. The partly oxidized alkyl groups may contain hydroxyl groups, aldehyde groups or keto groups. Besides alkyl groups, the term "oxidizable side chains" therefore includes, for example, hydroxylalkyl groups, esterified hydroxylalkyl groups, aldehyde groups, keto groups, monochloroalkyl groups and dichloroalkyl groups. Furthermore, these derivatives contain $(x-1)$ inert substituents, where $x$ is an integer from 1 to 4. These inert substituents may be nitro groups, halogen atoms or carboxyl groups.

The initial materials may be used as pure compounds or in admixture with each other, for example in the form of commercially available mixtures of isomers.

The following are examples of initial materials which may be used:

methylbenzene,
ethylbenzene,
n-propylbenzene,
isopropylbenzene,
n-butylbenzene,
secondary-butylbenzene,
dimethylbenzenes,
diethylbenzene,
di-n-propylbenzenes,
di-iso-propylbenzenes,
di-n-butylbenzenes,
di-secondary-butylbenzenes,
trimethylbenzenes,
triethylbenzenes,
tri-n-propylbenzenes,
tri-isopropylbenzenes,
tri-n-butylbenzenes,
tri-secondary-butylbenzenes,
ethyltoluenes,
ethyl-n-propyltoluenes,
ethyl-isopropyl-toluenes,
ethyl-secondary-butyltoluenes,
diethyltoluenes,
diethyl-n-propyltoluenes,
diethyl-isopropyltoluenes,
diethyl-secondary-butyltoluenes,
triethyl-toluenes,
triethyl-n-propyltoluenes,
triethyl-isopropyltoluenes,
triethyl-secondary-butyltoluenes,
n-propyl-ethylbenzenes,
iso-propylethylbenzenes,
n-butylethylbenzenes,
secondary-butylethylbenzenes,
dimethyl-ethylbenzenes,
di-n-propylethylbenzenes,
di-isopropylethylbenzenes,
di-n-butylethylbenzenes,
di-secondary-butylethylbenzenes,
trimethylethylbenzenes,
tetraethylbenzenes,
tri-n-propylethylbenzenes,
tri-isopropylethylbenzenes,
tri-n-butylethylbenzenes,
tri-secondary-butylethylbenzenes,
isopropyl-n-propylbenzenes,
n-butyl-n-propylbenzenes,
secondary-butyl-n-propylbenzenes,
dimethyl-n-butylbenzenes,
di-isopropyl-n-propylbenzenes,
di-n-butyl-n-propylbenzenes,
di-secondary-butyl-n-propylbenzenes,
trimethyl-n-propylbenzenes,
triethyl-n-propylbenzenes,
tri-n-propylbenzenes,
tri-isopropylbenzenes,
tri-n-butyl-n-propylbenzenes,
tri-secondary-butyl-n-propylbenzenes,
n-butyl-isopropylbenzenes,
secondary-butyl-isopropylbenzenes,
dimethyl-isopropylbenzenes,
diethyl-isopropylbenzenes,
di-isopropylbenzenes,
di-n-propyl-isopropylbenzenes,
di-secondary-butyl-isopropylbenzenes,
trimethyl-isopropylbenzenes,
triethyl-isopropylbenzenes,
tri-isopropylbenzenes,
tri-n-butyl-isopropylbenzenes,
isobutyl-n-butylbenzenes,
dimethyl-isobutylbenzenes,
diethyl-isobutylbenzenes,
di-n-propyl-isobutylbenzenes,
di-isopropyl-isobutylbenzenes,
di-n-butylisobutylbenzenes,
di-secondary-butyl-isobutylbenzenes,
trimethylisobutylbenzenes,
triethyl-isobutylbenzenes,
tri-n-propyl-isobutylbenzenes,
tri-isopropyl-isobutylbenzenes,
dimethyl-secondary-butylbenzenes,
diethwyl-secondary-butylbenzenes,
di-n-propyl-secondary-butylbenzenes,
di-isopropyl-secondary-butylbenzenes,
di-n-butyl-secondary-butylbenzens,
trimethyl-secondary-butylbenzenes,
triethyl-secondary-butylbenzenes,
tri-n-propyl-secondary-butylbenzenes,
tri-isopropyl-secondary-butylbenzenes,
tri-n-butyl-secondary-butylbenzenes,
benzyl alcohol,
benzaldehyde,
toluyl alcohols,
toluyl aldehydes,
toluyl carboxylic acids,
acetophenone,
α-hydroxyethylbenzene,
hydroxymethyl-benzyl alcohols,
hydroxymethyl-benzaldehydes,
hydroxymethyl-toluyl-carboxylic acids,
benzyl chloride,
xylylene chloride,
benzal chloride,
xylylene dichloride.

In the process according to the invention, the temperature of the mixture of the reactants (i.e., the oxidizable compound and the nitric acid) is at least 20° C. below the reaction temperature, but not above 180° C. There should be no reaction during the mixing. Mixing is carried out continuously in the usual manner. Mixing may be so intense that an emulsion is formed. When it is desired to use as initial material nitric acid with a higher concentration than is to be used in the oxidation, mixing of the nitric acid with water advantageously takes place together with or immediately prior to the mixing with the compounds to be oxidized.

The mixed reactants are supplied to the reactor while maintaining the turbulence. By turbulence we mean that the Reynolds number for the flowing mixture is above 2,300.

Upon entry into the reaction chamber, the velocity of flow is decreased to at least one third. The velocity of flow may also be decreased to a much greater extent and, in the limiting case, the reactants may be introduced into a vessel containing a stationary fluid (velocity zero). The only important point is that, upon entry of the mixed reactants into the reaction chamber, a rise in temperature occurs immediately at the point of entry owing to hot reaction products being sucked back, so that oxidation occurs immediately.

The temperature in the oxidation zone can be adjusted in various ways, for example through the concentration of the nitric acid, the temperature increasing with the concentration of the nitric acid, or through the temperature at which the mixed but not yet reacting reactants are introduced into the reaction zone. If the concentration of the nitric acid used for the oxidation or the mixing temperature of the reactants is so low that oxidation in the reaction zone takes place very slowly and the increase in temperature occurring as a result of the exothermic reaction is too small, it is possible to produce the reaction temperature by directly blowing in steam at the point of entry of the reaction mixture into the reaction chamber. Another possibility for controlling the temperature comprises varying the pressure in the reaction chamber. The oxidation itself is carried out adiabatically, i.e., without any external heating or cooling of the reaction chamber. There is no heat exchange through the walls of the reaction chamber.

The process according to this invention will now be described with reference to FIGURE 1. 30 to 60% by weight of the nitric acid to be used is introduced through a pipe 1, diluting water for the nitric acid through a pipe 2, aromatic compound to be oxidized through a pipe 3 into a mixing apparatus 4. Preheaters 1a, 2a and 3a are provided. The mixing apparatus contains means for the intensive mixing or emulsification of the initial materials, for example a system of successive jet mixers or perforated screens. After mixing has taken place, the initial materials enter at the bottom of a vertical reactor 7. At the point of entry 5 the speed of the mixture or emulsion is decreased by the ratio of reactor cross-section to tube cross-section and the reaction is initiated because the initial material entering as a jet is immediately heated up to reaction temperature by sucking back hot reaction product (as indicated by the arrows). A pipe 6 is provided for the introduction of superheated steam. It serves for heating up the reactor or for controlling the reaction temperature in a manner described below. If steam is used for temperature control it must be introduced in such a way, for example through an annular tube surrounding the inlet tube for the premixed reactants, that the steam mixes with the reactants immediately upon entry. The remainder of the nitric acid is introduced at 8. The point of entry is about in the middle third of the reactor, advantageously in the middle of the reactor. It is advantageous to introduce the nitric acid through a pipe which has its opening directed upward in the axis of the reactor and whose cross-section is such that the speed of flow of the entering nitric acid is diminished to at least one third. This causes eddies to be formed above the point of entry with the flow being rendered turbulent. The concentration of the nitric acid may be the same as the concentration of the nitric acid fed in at the lower end of the reactor, but may also be higher or lower. It is advantageous to work with nitric acid concentrations of about 10 to 45%, preferably 15 to 30%.

The nitric acid may be preheated to a temperature below the reaction temperature. It is also possible, however, to supply the heat required wholly or partly by superheated steam and for this purpose, as at the bottom of the reactor, a pipe for the feed of steam may be provided in the vicinity of the inlet 8 where the remaining nitric acid is added. It is thus possible to distribute the amount of steam required between the lower and upper halves of the reactor. In the middle of the reactor also it is advantageous to supply the steam concentrically about the inlet for the nitric acid, for example by a ring of jets. When carrying out the reaction in the way described above, the reaction is initiated without any delay and is absolutely safe because the location of the reaction zone is easy to control and any overheating which would lead to an uncontrollable course of the reaction is avoided. The oxidation products are withdrawn at the upper end of the reactor, possibly through a dip tube, decompressed through a valve 9 and supplied through a pipe 10 to the working up. A manometer 11 indicates the pressure in the reactor.

In the case of any aromatic compounds which are slow to react it may be advantageous to provide the reactor with a circulation tube. Such an arrangement is shown diagrammatically in FIGURE 2. By means of the circulation tube 12, hot substantially oxidized reaction product is returned to the point at which the reaction is initiated. The length of the circulation tube should be at least equal to the diameter of the reactor and advantageously equal to 2 to 20 times the reactor diameter; it is determinend by the reaction speed at a given temperature.

The temperature in the reaction zone is advantageously controlled by means of a control loop, the temperature in the reaction zone being measured by a thermocouple 13. The thermocouple is conveniently located at a point where complete mixing of the entering reaction mixture with the oxidation mixture has already taken place. The regulating member of the control loop influences either the amount of diluent water and consequently the concentration of the nitric acid, or the preheating temperature of the individual reactants, or the amount of steam for mixing with the reactants which is supplied beneath the reaction zone through pipe 6. The temperature of the reaction zone may also be controlled by the pressure in the oxidation tube. The reactor operates adiabatically in all cases and merely requires an insulation.

By the process according to this invention the oxidation products are obtained in higher yields and purity than by the process in which the nitric acid is supplied only at the lower end of the reactor. Moreover, the new process has a smaller consumption of nitric acid. Thus, for example, in the oxidation of p-xylene, the amount of nitric acid required for complete oxidation is the amount theoretically necessary, i.e., 4 moles of nitric acid per each mole of xylene, or an excess of at the most 10%, i.e., 4.8 moles of nitric acid. When oxidizing with the amount of nitric acid theoretically necessary, it is advantageous to feed in about 60% by weight at the lower end of the reactor and about 40% by weight in the middle of the reactor.

The invention is illustrated by but not limited to the following example.

*Example*

60 liters of p-xylene of 90° C. and 325 liters of 20% nitric acid of 108° C. are intensely mixed per hour in a mixer and pumped through a pipe having a diameter of 6 mm. into a tantalum-lined reactor having 5 m. in length and 90 mm. in diameter from below. 325 more liters of 20% nitric acid of 108° C. is fed in per hour through a 6 mm. pipe into the middle of the reactor, i.e., at a height of 2.50 m., while 72 kg. of steam is introduced through a pipe provided at the same place at a pressure of 100 atmospheres gage. In each half of the reactor seven concentrically arranged annular screens having a diameter of 70 mm. each are accommodated at intervals of 30 cm. The temperature is 269° C. in the lower half of the reactor and 267° C. in the upper half. The pressure is 75 atmospheres gage. The reaction product is withdrawn at the top of the reactor and decompressed to atmospheric pressure. The reaction gas is separated. The liquid pulp is cooled to 0° C., filtered at this temperature and washed with water. 75 kg. per hour of terephthalic acid (93% of the theory) is obtained having the following composition:

| | Percent |
|---|---|
| Terephthalic acid | 96.27 |
| p-Nitrobenzoic acid | 2.33 |
| 3-nitrotoluic acid | 0.23 |
| p-Toluic acid | 1.07 |
| p-Cyanobenzoic acid | 0.08 |

When operating under the same conditions but introducing the total amount of nitric acid (650 liters per hour) along with the steam of 100 atmospheres gage into the reactor from below, 71.7 kg. per hour of terephthalic acid (89% of the theory) is obtained having the following composition:

| | Percent |
|---|---|
| Terephthalic acid | 93.11 |
| p-Nitrobenzoic acid | 3.64 |
| 3-nitrotoluic acid | 1.83 |
| p-Toluic acid | 1.12 |
| p-Cyanobenzoic acid | 0.23 |

We claim:
1. In a continuous process for the production of aromatic carboxylic acids by oxidation of derivatives of benzene substituted by from 1 to 6 oxidizable side chains with 1 to 4 carbon atoms, said side chains being selected from the class consisting of alkyl groups, hydroxyalkyl groups, alkyl groups substituted by an aldehyde group, alkyl groups substituted by a keto group, monochloroalkyl groups and dichloroalkyl groups, said derivatives being further substituted by $(x-1)$ inert substituents selected from the class consisting of nitro groups, halogen atoms and carboxylic groups, $x$ denoting an integer from 1 to 4, at an oxidation temperature of from 150° to 400° C., comprising mixing the compound to be oxidized with nitric acid of from 10 to 40 weight percent concentration in a mixing apparatus at a temperature below said oxidation temperature, leading the resultant mixture with turbulent flow into a reaction zone wherein a pressure of from 10 to 150 atmospheres is maintained and the temperature is maintained adiabatically at from 150° to 400° C., decreasing the velocity of flow of said mixture upon entry into said reaction zone to at least one third, avoiding a gas space at the upper end of said reaction zone, and withdrawing the reaction product at said upper end of said reaction zone, the improvement which comprises introducing 30 to 60% by weight of the nitric acid to be used from the bottom into the reaction zone and 40 to 70% into the middle third of the reaction zone.

2. A process as claimed in claim 1, wherein the nitric acid of from 10 to 40 weight percent concentration is prepared from more highly concentrated nitric acid and water immediately prior to mixing with the compound to be oxidized.

3. A process as claimed in claim 1, wherein at least one of the two reactants is preheated prior to mixing to a temperature of between room temperature and the oxidation temperature.

4. A process as claimed in claim 1, wherein the nitric acid of from 10 to 40 weight percent concentration is prepared from more highly concentrated nitric acid and water immediately prior to mixing with the compound to be oxidized and at least one of the three components nitric acid, compound to be oxidized and water is preheated prior to mixing to a temperature of between room temperature and the oxidation temperature.

References Cited by the Examiner

UNITED STATES PATENTS 3,165,548  1/1965  Bartholome et al. ____ 260—524

FOREIGN PATENTS 720,384  12/1954  Great Britain.

LORRAINE A. WEINBERGER, *Primary Examiner.*

DANIEL D. HORWITZ, *Examiner.*

S. B. WILLIAMS, *Assistant Examiner.*

UNITED STATES PATENT OFFICE
CERTIFICATE OF CORRECTION

Patent No. 3,271,445                        September 6, 1966

Ernst Bartholome et al.

It is hereby certified that error appears in the above numbered patent requiring correction and that the said Letters Patent should read as corrected below.

Column 3, line 51, for "dimethyl-n-butylbenzenes" read -- dimethyl-n-propylbenzenes --; column 4, line 9, for "diethwyl" read -- diethyl --.

Signed and sealed this 29th day of August 1967.

(SEAL)
Attest:

ERNEST W. SWIDER                          EDWARD J. BRENNER
Attesting Officer                              Commissioner of Patents